(12) United States Patent
Hanson

(10) Patent No.: US 6,753,975 B1
(45) Date of Patent: Jun. 22, 2004

(54) MEDIA MAPPING FOR CUSTOMIZED IMAGING IN A PRINTER

(75) Inventor: Gary Hanson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/394,955

(22) Filed: Sep. 10, 1999

(51) Int. Cl.[7] ........................ G06F 15/00; G03B 15/00
(52) U.S. Cl. ................. 358/1.18; 358/909.1; 396/2
(58) Field of Search ................. 358/1.18, 1.12, 358/1.1, 1.5, 909.1, 503, 302, 296; 400/342, 279, 708, 120.01; 396/2

(56) References Cited

U.S. PATENT DOCUMENTS

| | | | | |
|---|---|---|---|---|
| 4,538,905 A | | 9/1985 | Griego et al. ........... 355/14 SH |
| 5,127,752 A | * | 7/1992 | Courtney ................... 400/342 |
| 5,618,120 A | * | 4/1997 | Ishikawa ..................... 400/708 |
| 5,825,996 A | * | 10/1998 | Davis et al. ............... 358/1.18 |
| 5,864,774 A | * | 1/1999 | Jones .......................... 702/94 |

* cited by examiner

Primary Examiner—Twyler Lamb
(74) Attorney, Agent, or Firm—Lane R. Simmons

(57) ABSTRACT

A method of imaging in an imaging device includes optically mapping a surface area of media to be imaged by the imaging device and controlling the imaging device based on the mapped surface area such that imaging occurs only on the media. Preferably, the surface area includes substantially an entire area of the media associated with at least one given scan line of the imaging device. Mapping of the surface area includes identifying peripheral bounds of the media and voids, if any, in the media. In a laser printer employing the present invention, image development is controlled by enabling and disabling the laser beam based on image data in coordination with the mapped surface area of the media.

25 Claims, 9 Drawing Sheets

MEDIA MAPPING FOR CUSTOMIZED IMAGING IN A PRINTER

FIELD OF THE INVENTION

This invention relates in general to imaging devices and, more particularly, to optical scanning of media configurations in a printer for controlling imaging in the printer relative to the characterized media configurations.

BACKGROUND OF THE INVENTION

Imaging devices, such as laser printers, ink jet printers, copiers, facsimile machines and the like, typically include a media processing path for enabling the transfer of a sheet of media through the device. Generally, the media is picked from an input bin, transferred to an imaging station where the image is developed, and then passed on to an output bin. Often, sensors are disposed in the media processing path for detecting when the media is picked, such as by detecting a leading edge of the media, or for detecting other peripheral edges of the media to enable the imaging system to adjust for media size and skew within certain pre-defined parameters. U.S. Pat. Nos. 5,127,752 and 4,538,905, incorporated in full herein by reference, teach exemplary systems employing media periphery edge detect sensors for enabling image alignment to the media being transferred in the processing path.

One drawback with conventional media periphery sensing systems is that they are typically limited in design to work only with conventional predetermined media sizes such as 8½×11 inch "letter" sheets, 8½×14 inch "legal" sheets, A4 sized sheets, envelopes, etc. Thus, any custom defined media size and/or shape that departs from the norm may not be detected, handled or imaged properly by the imaging device. For example, if a hexagonal sided or other odd shaped media is transferred into a media processing path (assuming the device/path could handle it using, for example, electronic tacking of the media to a transfer belt), then the correct size and shape of the "odd" shaped media is simply not properly detected. Rather, a known default size is generally used. As such, undesired imaging outside of the actual peripheral boundaries of the media may occur, thereby causing wasteful, messy and improper toner development or ink deposits in the system.

Additionally, conventional sensing systems do not detect or account for voids within the periphery of the media being processed. For example, if a hole-punched sheet of "letter" size media is passed through the device for imaging purposes, the holes are not recognized and image development is attempted as if the sheet were whole and did not have the holes. In this context, assuming imaging is to occur at the location of the holes, improper attempted imaging in the area of the holes (voids) will also cause wasteful, messy and improper toner development or ink deposits in the system.

Accordingly, an object of the present invention is to enable full media mapping in an imaging device to ensure image development only on the media.

SUMMARY OF THE INVENTION

According to principles of the present invention in a preferred embodiment, a method of imaging in an imaging device includes optically mapping a surface area of a media to be imaged by the imaging device and controlling the imaging device based on the mapped surface area such that imaging occurs only on the media. Preferably, the surface area includes substantially an entire area of the media associated with at least one given scan line of the imaging device. Mapping of the surface area includes identifying peripheral bounds of the media and voids, if any, in the media. In a laser printer employing one embodiment of the present invention, image development is controlled by enabling and disabling the laser beam based on image data in coordination with the mapped surface area of the media.

According to further principles, an imaging device such as a laser printer, copier or ink jet printer includes components for enabling the above described method.

Other objects, advantages, and capabilities of the present invention will become more apparent as the description proceeds.

DETAILED DESCRIPTION OF THE INVENTION

Figure 1:
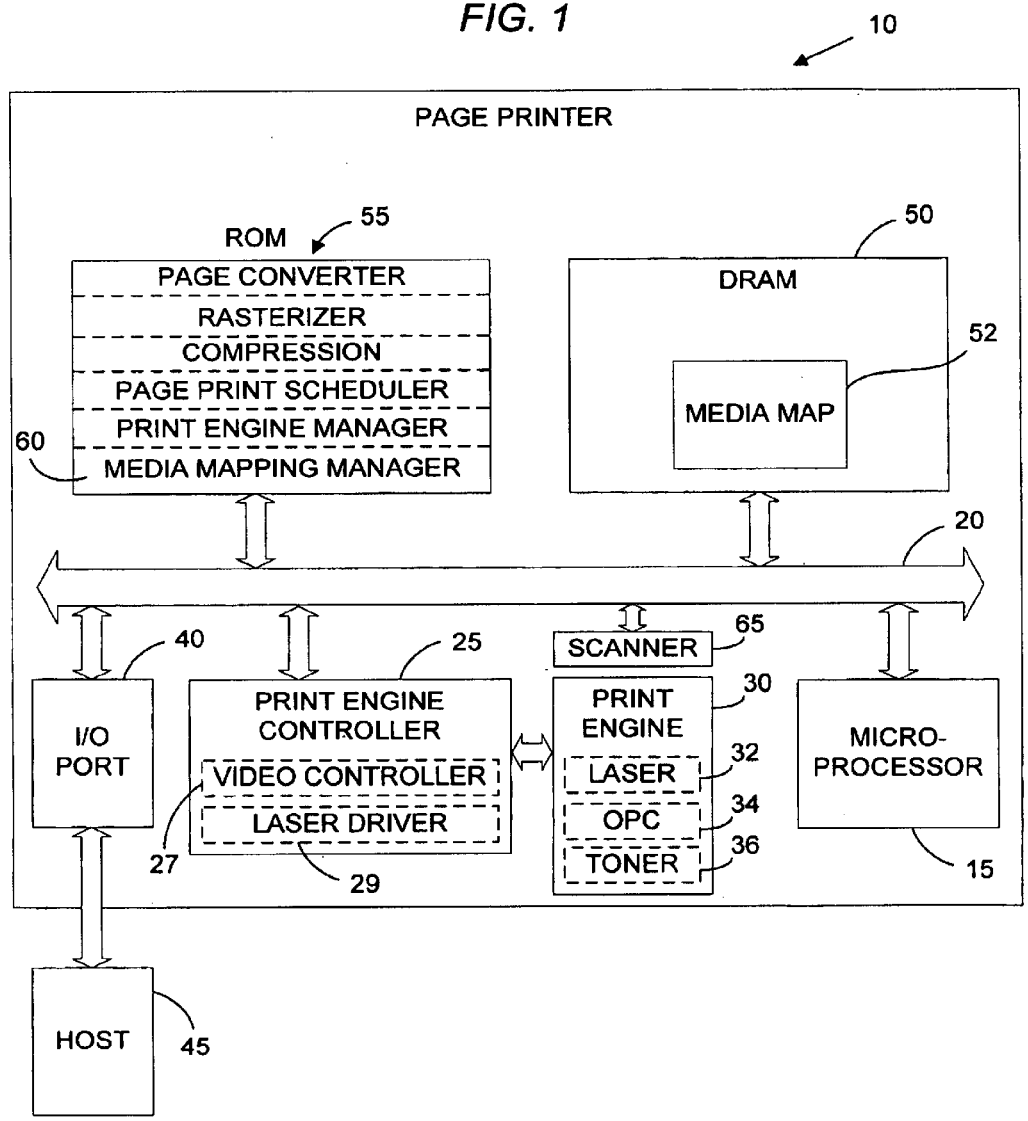
FIG. 1 is a block diagram of an electrophotographic page printer employing one embodiment of the present invention media mapping apparatus and method.

FIG. 1 is a block diagram of a page printer 10 employing one embodiment of the present invention method and apparatus for mapping a surface area of media processed by printer 10 and for controlling imaging onto the media. Page printer 10 is controlled by a microprocessor 15 which communicates with other elements of the system via bus 20. A print engine controller 25 and associated print engine 30 connect to bus 20 and provide the print output capability for the page printer. For purposes of this disclosure, print engine 30 is a laser printer that employs an electrophotographic drum and imaging system utilizing discharge area development that is well known in the art. However, as will be obvious to those of ordinary skill in the art, the present invention is similarly applicable to other types of printers and/or imaging devices including, for example, ink jet printers, facsimile machines, digital copiers, or the like. It should be noted here that like components across the Figures are identified with like reference numbers.

An input/output (I/O) port 40 provides communications between the page printer 10 and a host computer 45 and receives page descriptions (or raster data) from the host for processing within the page printer. A dynamic random access memory (DRAM) 50 provides a main memory for the page printer for storing and processing a print job data stream received from host 45. A read only memory (ROM) 55 holds firmware which controls the operation of microprocessor 15 and page printer 10. Code procedures stored in ROM 55 include, for example, a page converter, rasterizer, compression code, page print scheduler, print engine manager, and/or other image processing procedures (not shown) for generating an image from a print job data stream.

Importantly, according to the present invention, ROM 55 further includes media mapping manager 60 for: (i) cooperating with scanner device 65 to enable mapping of media being processed through print engine 30, (ii) generating media map 52 in memory 50 based on the media scanned, and (iii) controlling imaging of the media in printer 10 based on map 52. Although in a preferred embodiment media mapping manager 60 is implemented as firmware in ROM 55, it is understood that it may also be embodied as software in RAM 50 or in hardwired circuitry (such as an ASIC embedded in print engine controller 25). Media mapping manager 60 includes executable instructions, routines, tables and/or other data structures necessary for managing media mapping and imaging by printer 10 as will be discussed more fully herein.

In general, the operation of page printer 10 commences when it receives a page description from host computer 45 via I/O port 40 in the form of a print job data stream. The page description is placed in DRAM 50 and/or a cache memory associated with microprocessor 15. Microprocessor 15 accesses the page description, line by line, and builds a display command list using the page converter firmware in ROM 55. Each display command defines an object to be printed on the page. As the display command list is being produced, the display commands are sorted by location on the page and allocated to page strips in memory 50. As needed, the rasterizer firmware converts each display command to an appropriate bit map (rasterized strip or band) and distributes the bit map into memory 50. The compression firmware compresses the rasterized strips as specified or in the event insufficient memory exists in memory 50 for holding the rasterized strips. When all page strips have been evaluated, rasterized, compressed, etc. for processing by print engine 30, the page is closed and the rasterized strips are passed to print engine 30 by print engine controller 25, thereby enabling the generation of an image (i.e., text/graphics etc). The page print scheduler controls the sequencing and transferring of page strips to print engine controller 25. The print engine manager controls the operation of print engine controller 25 and, in turn, print engine 30.

Processor 15 feeds to video controller 27 a raster image of binary values which represent the image to be imprinted on a page. The video controller 27, in response, feeds a series of binary data signals to a laser driver 29 which, in turn, modulates laser 32 in accordance with the binary data signals.

As conventional in the art, the modulated beam 33 (FIG. 2) from laser 32 is directed at a rotating, faceted mirror 35 (FIG. 2) which scans the beam across an imaging lens which directs the scanned beam to a mirror which redirects the scanned beam onto a moving optical photoconductor (OPC) 34. The laser beam is scanned across the OPC to cause selective discharge thereof in accordance with the modulation of the beam. At the termination of each scan action, the laser beam is incident on a photodetector which outputs a beam detect signal that is used to synchronize the actions of video controller 27 and processor 15. Subsequent to the selective discharge of OPC 34, toner 36 is applied (deposited) onto the discharged pixel locations to form a visible image on OPC 34. The visible image is then transferred to a print media such as a sheet of paper that is passed through printer 10.

Further to the operation of printer 10 and according to principles of the present invention, media mapping manager 60 controls scanner device 65 to enable a full mapping of media passing through printer 10, including mapping of all peripheries and any voids within the peripheries of the media. Additionally, media mapping manger 60 controls an enabling and disabling of laser 32 such that image formation occurs only at locations on OPC 34 that correspond to physical locations on the media identified by the map. In this context, custom sized, shaped or cut media is fully mapped, and imaging is controlled such that no image development occurs outside of the peripheries of the media or at any locations where voids exist within the peripheries of the media.

Figure 2:
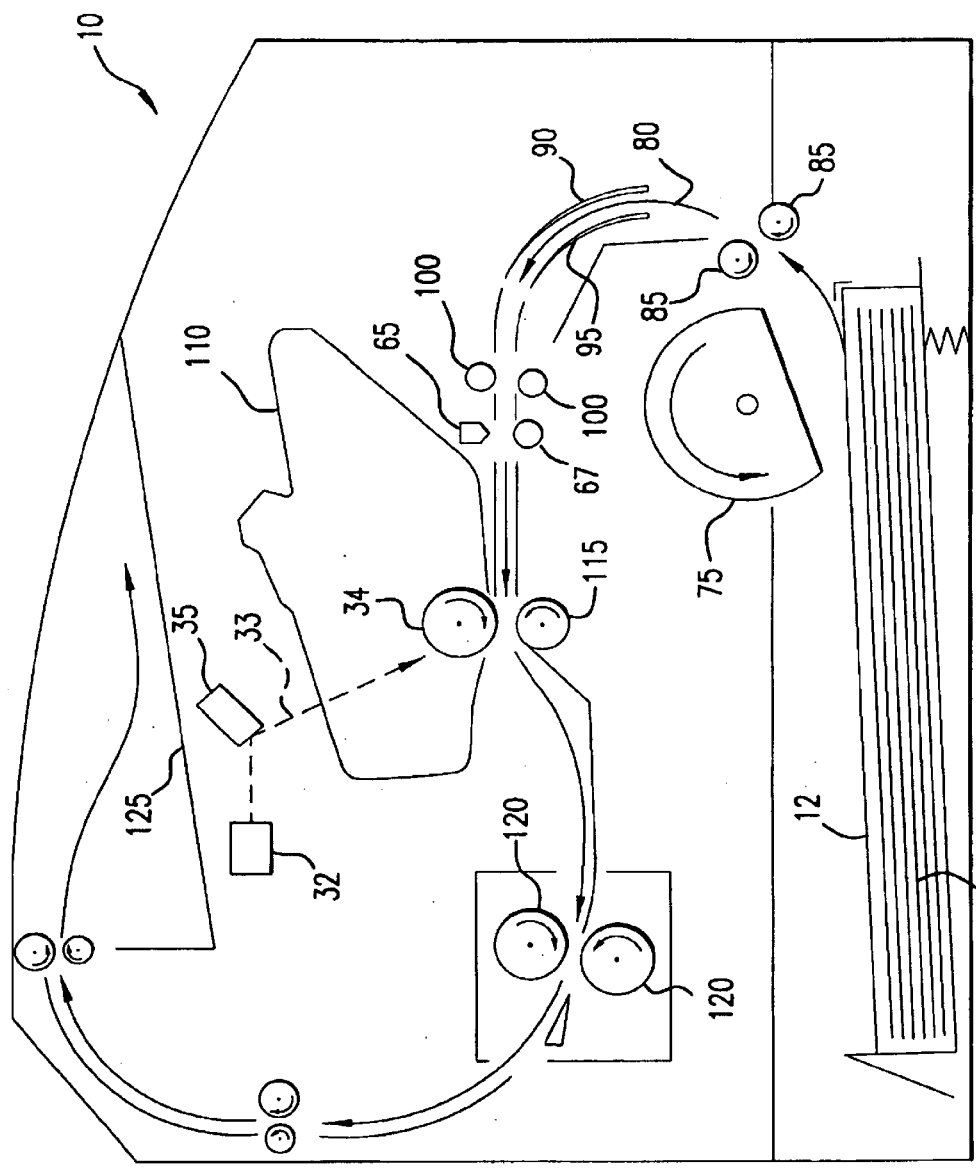
FIG. 2 is one embodiment of a schematic block diagram of the printer and media mapping apparatus of FIG. 1.

FIG. 2 is a schematic block diagram of printer 10 depicting the media processing path and relative locations of certain components within the printer. Input tray 12 holds media 70. Although media 70 may be any conventional sheet media such as letter, legal, A4 or envelopes, the present invention is particularly applicable to non-conventional media, such as media that is custom cut (including media having voids therein), or that is custom shaped or sized apart from conventional sheet media. Feed roller 75 picks top sheet 80 from media stack 70 in input tray 12 and advances it to a pair of transport rollers 85. Transport rollers 85 further advance sheet 80 through paper guides 90 and 95, registration rollers 100, and toward drive roller 67 and scanner device 65. In a preferred embodiment, scanner device 65 is an electro-optical contact image sensor (CIS) array device, although other photo sensor systems are similarly feasible such as a charge coupled photo sensor device (CCD). Alternatively, other energy wavelength scanner devices are similarly feasible, such as infrared.

Importantly, after control of sheet 80 is established in the media processing path, it is moved through the path and scanned by scanner device 65 to generate a digital pixel map 52 of the entire surface area of the sheet. This media map 52 identifies (characterizes) information about sheet 80 including the location and shape of its edges, and the location, size and shape of voids, if any, in the sheet. The media map 52 is stored in memory 50 or in a cache memory associated with processor 15.

After passing by scanner 65, sheet 80 is advanced to photoconductive drum 34 (of toner cartridge 110) and transfer roller 115 for actual imaging. At this point, the media map 52 is used by media mapping manager 60 to control the writing or pulsing of laser 32 such that beam 33 only discharges OPC 34 at locations that correspond to physical locations of sheet 80 identified by the map. In other words, the map data is compared to image data signals sent to modulate laser 32 and if there are image data signals that correspond to discharging pixels on OPC 34 at locations other than where pixels are located corresponding to the surface area of sheet 80 as identified by the map, then laser 32 is disabled for those pixels via laser driver 29 to not generate the image at those locations. In this manner, the media map 52 ensures image development on OPC 34 and/or sheet 80 only at locations where sheet 80 exists and not beyond any custom shaped or sized edges of the sheet and not where any voids may exist within the sheet. Thus, wasteful, messy and improper toner development is avoided. Where image data signals exist to develop pixels on OPC 34 at locations corresponding to the surface area of sheet 80 as identified by the map, then laser 32 is enabled for those pixels to generate the image at those locations. Once beam 33 discharges OPC 34, toner 36 is applied as conventional in the art and the image is transferred to sheet 80 using transfer roller 115. Sheet 80 then moves through heated fuser rollers 120 and finally to output bin 125.

Figure 3:
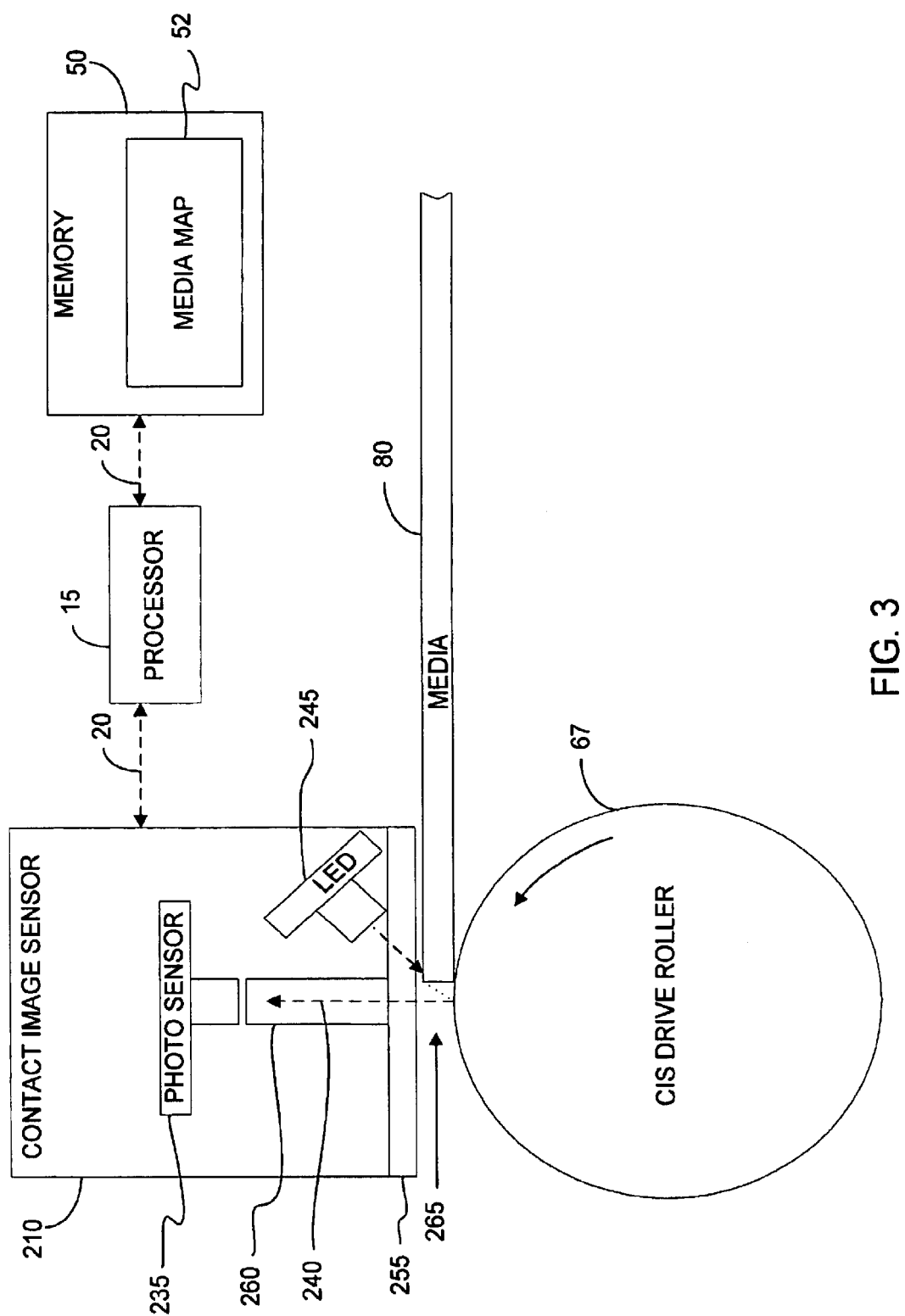
FIG. 3 is a block diagram of one embodiment of a scanner device employed by the printer of FIGS. 1 and 2 for generating a media map according to one embodiment of the present invention.

FIG. 3 is a block diagram of scanner device 65 showing a preferred embodiment utilizing contact image sensor (CIS) 210. CIS 210 includes a photo sensor device 235, such as a photo diode, for sensing light 240. The light 240 is produced by light source 245 and is reflected off of CIS drive roller 67 up through glass plate 255 and self-focusing lens 260 to photo sensor 235. Light source 245 is any conventional light source such as a light emitting diode (LED). CIS 210 and drive roller 67 are pressure supported adjacent each other to form nip 265 for receiving media 80 such that drive roller 67 is able to pull media 80 through the nip for imaging by CIS 210. Although not shown, a plurality of photo sensors 235, self-focusing lenses 260, and light sources 245 are actually provided sufficient to form a linear array scan line for scanning a defined area as conventional in the art for an imaging scanner. In such a configuration, there are multiple photo sensors 235 (i.e., a photo sensor array) for each self-focusing lens 260, and there are multiple self-focusing lens 260 for each light source 245. However, only one of each of these components is shown for ease of discussion and clarity of depiction. The electrical charge built up in photo sensor 235, in response to the exposure to light 240, is discharged to processor 15 and memory 50 as a signal through bus 20 to generate media map 52 as directed by media mapping manager 60.

In a preferred embodiment, CIS drive roller 50 is of a darker color rather than a lighter color, assuming media 80 is typically of a lighter color. The darker color provides for improved sensing of periphery edges of the media and of voids in the media as it is exposed to light source 245.

Figure 4:
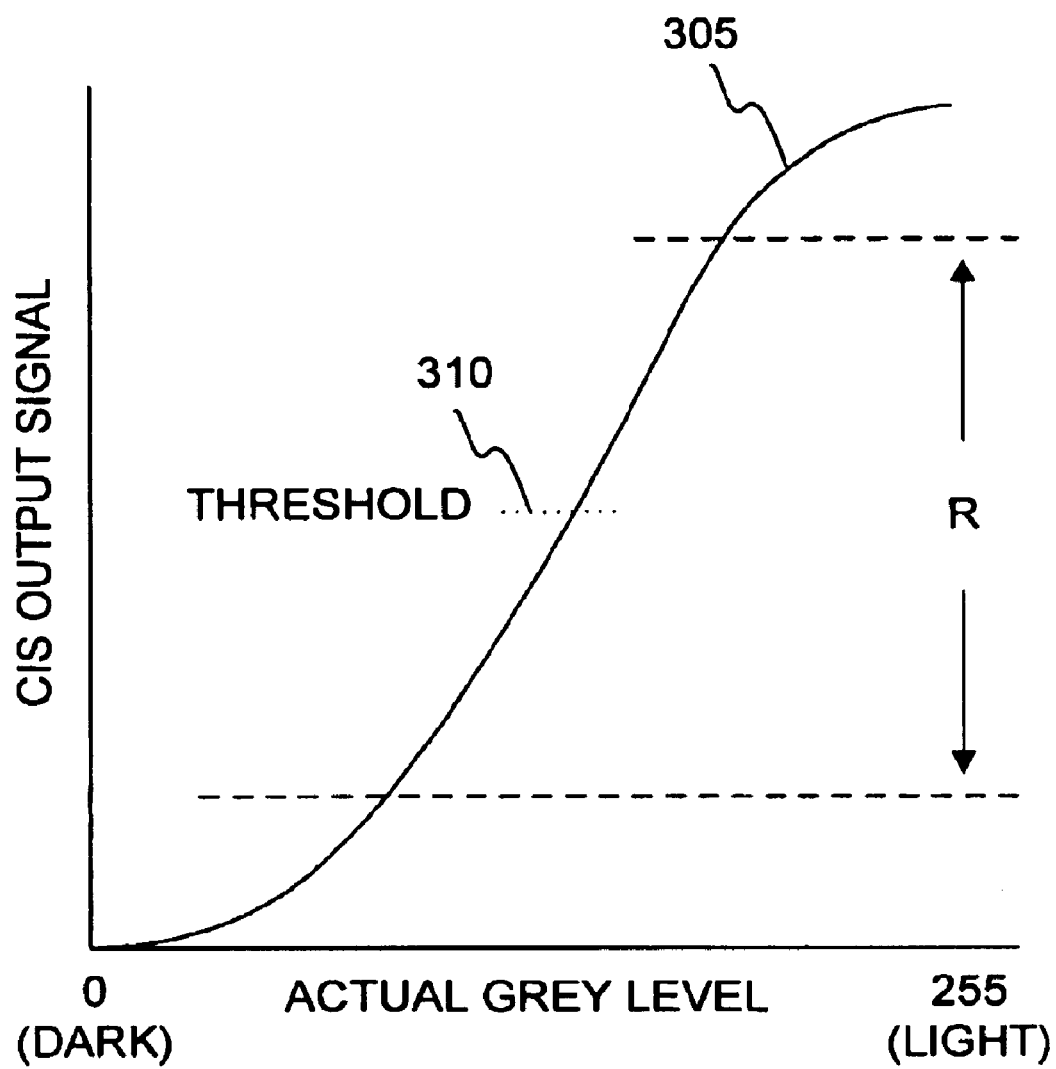
FIG. 4 is a graph representative of a gamma table for determining a threshold amount of light impingement upon a contact image sensor for generating a media map according to one embodiment.

A light impingement threshold value for detecting the surface area of sheet 80, including edges and voids, is set by referencing a gamma table as represented by the graph in FIG. 4. Graphed line 305 represents an output signal from CIS 210, indicative of light impingement upon the CIS, as the surface area of media 80 is detected. The lower left corner of the graph, denoted with the actual grey level number zero, represents when darkness is detected because a lesser amount of light is reflected off of the drive roller 67 support surface (thus none or minimal, CIS output). As media 80 is scanned, the amount of lightness detected is represented by 255 grey levels (in this example). Accordingly, the lighter (more reflective) the media detected, the more the unit measurement level approaches 255 and the greater the output signal 305 of the CIS. A predefined range "R" is a preferred range for setting a target window impingement threshold value 310. Range "R" is typically defined within about 10% of the grey level upper and lower extremes, but may vary depending upon design criteria and manufacturing capabilities of the CIS. Threshold value 310 is best determined by design criteria also. If it is set too low, then what is being detected may actually be foreign particles rather than media 80. If it is set too high, the media may not be detected at all. In any case, threshold 310 is set so as to detect differences in light impingement between drive roller 67 and media 80, whether it be at the periphery edges of media 80 or at voids in the media, to thereby generate media map 52 for controlling laser 32.

Figure 5:
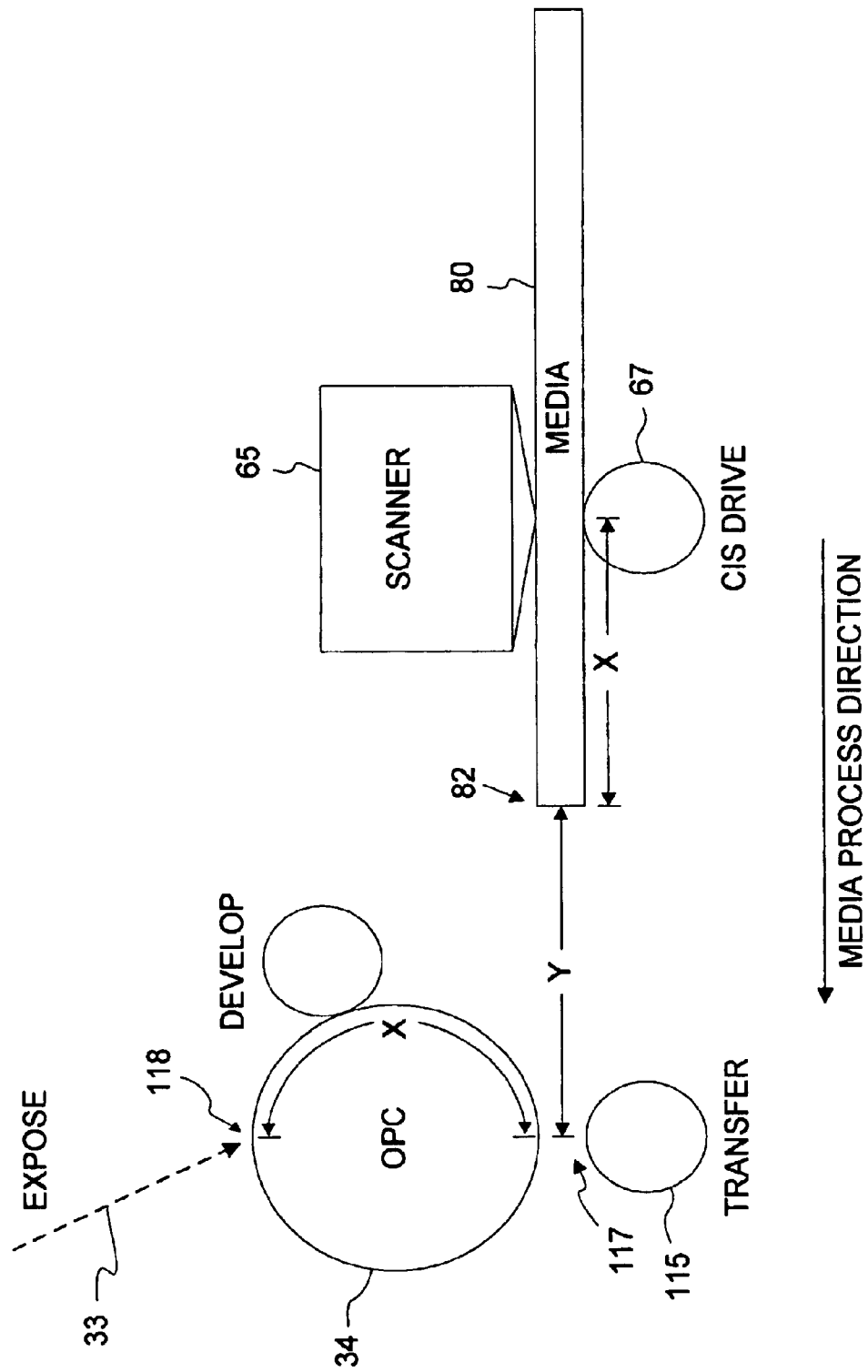
FIG. 5 is a block diagram depicting one embodiment of the relationship of the optical photoconductor and scanner components of the printer of FIG. 1.

Referring now to FIG. 5, a schematic diagram depicts an exemplary positioning of scanner device 65 relative to OPC 34 and transfer roller 115. In a preferred embodiment, scanner device 65 is positioned x+y scan lines from nip 117, where nip 117 defines the image transfer location between OPC 34 and transfer roller 115. The value "x" is the arc distance typically in measured scan lines defined between: (i) the point of exposure 118 by laser beam 33 on OPC 34, and (ii) nip 117. The value "y" is also measured in scan lines and is defined in part by the physical placement/geometry of OPC 34 and scanner device 65. Specifically, where scanner 65 is physically disposed "x" scan lines from nip 117, then y=0. On the other hand, where scanner 65 is not or cannot be disposed "x" scan lines near to nip 117, then it is disposed x+y scan lines away from nip 117, where the value "y" equals any number of scan lines from one to the maximum number of scan lines for scanning any given media 80.

Preferably, y equals some value less than the maximum number of scan lines for scanning media 80 to reduce memory usage in building map 52 and to avoid potential imaging error during media movement. However, the smaller y becomes, the more critical the processing time becomes for processing the scanned data. For example, if y=0, then the map data most recently scanned is immediately used for controlling laser 32. In this context, subsequent processing of the map data must be minimal to none, depending upon overall system design criteria. On the other hand, if subsequent processing of the map data is desired, then y is set to a value sufficient to allow completion of such subsequent processing. For example, in a preferred embodiment where the building of map 52 results in a slight area adjustment relative to the actual surface area of media 80, then a preferred y value is 30–50 scan lines. However, again, the y value is set relative to overall system design parameters and capabilities. The discussion associated with FIG. 6 discloses an example of such subsequent processing for slightly adjusting map 52 relative to the actual surface area of media 80.

In any case, media map 52 uses that amount of memory 50 defined by x+y scan lines. Thus, where the value of "y" increases, such as in response to a requirement dictated by physical geometries of the system or data processing time requirements, then the amount of memory required to hold map 52 also proportionally increases. Additionally, the greater the "y" value, the greater the potential for error due to movement of media 80 in the processing path. Accordingly, again, a minimal "y" value is preferred that is just sufficient to enable any required processing of map data after the media is scanned and before the data is actually used to control the laser.

As leading edge 82 of media 80 moves past scanner 65 toward OPC 34, each scan line scanned by scanner 65 for mapping that respective surface area of the media is stored in memory 50 to generate a respective portion of media map 52. Then, when leading edge 82 reaches distance x from scanner 65, and as media 80 continues to move past distance x, each successive scan line of pixel data already stored in media map 52 is coordinated with image pixel data in printer 10 to subsequently image only those surface areas defined by media 80. Where image data corresponds to a location defined by the pixel data of media map 52, then beam 33 is pulsed to enable a write of the image data. Where image data does not correspond to a location defined by the pixel data of media map 52, then beam 33 is not pulsed to disable a write of the image data. As each scan line of map 52 is processed to control beam 33, a new scan line of data that maps a new respective portion of media 80 is stored in memory 50 in the place of the scan line just previously used until the entire surface area of media 80 is completely scanned and mapped and subsequently used for imaging control.

It should be noted here that, conventionally, a scan line is the path followed by laser beam 33 along OPC 34, caused by rotating faceted mirror 35, for enabling the discharging of OPC 34. The modulated beam 33 is moved across the charged surface of OPC 34 in a succession of scan lines as the OPC is rotated. Each scan line is logically divided into pixel areas dictated by the resolution of the image bitmap to be printed and the pitch of the laser scan. The modulated laser beam causes some pixel areas to be exposed to a light pulse and some not, thus causing a pattern of overlapping dots on each scan line according to the image bitmap.

Similarly, the one dimensional array of area sensed by scanner device 65 to produce media map 52 is also denoted as a scan line. Thus, when "scan line" is used herein, it references not only a scan line relative to laser beam 33 on OPC 34, but also to the one dimensional array of area sensed by scanner 65. Importantly, scanner 65 of the present invention provides a scan array sufficient in length to detect and map all pixels for any given laser scan line of printer 10. Thus, preferably, the scan line dimension sensed by scanner device 65 corresponds substantially to the scan line dimension of laser beam 33 across OPC 34.

Figure 6:
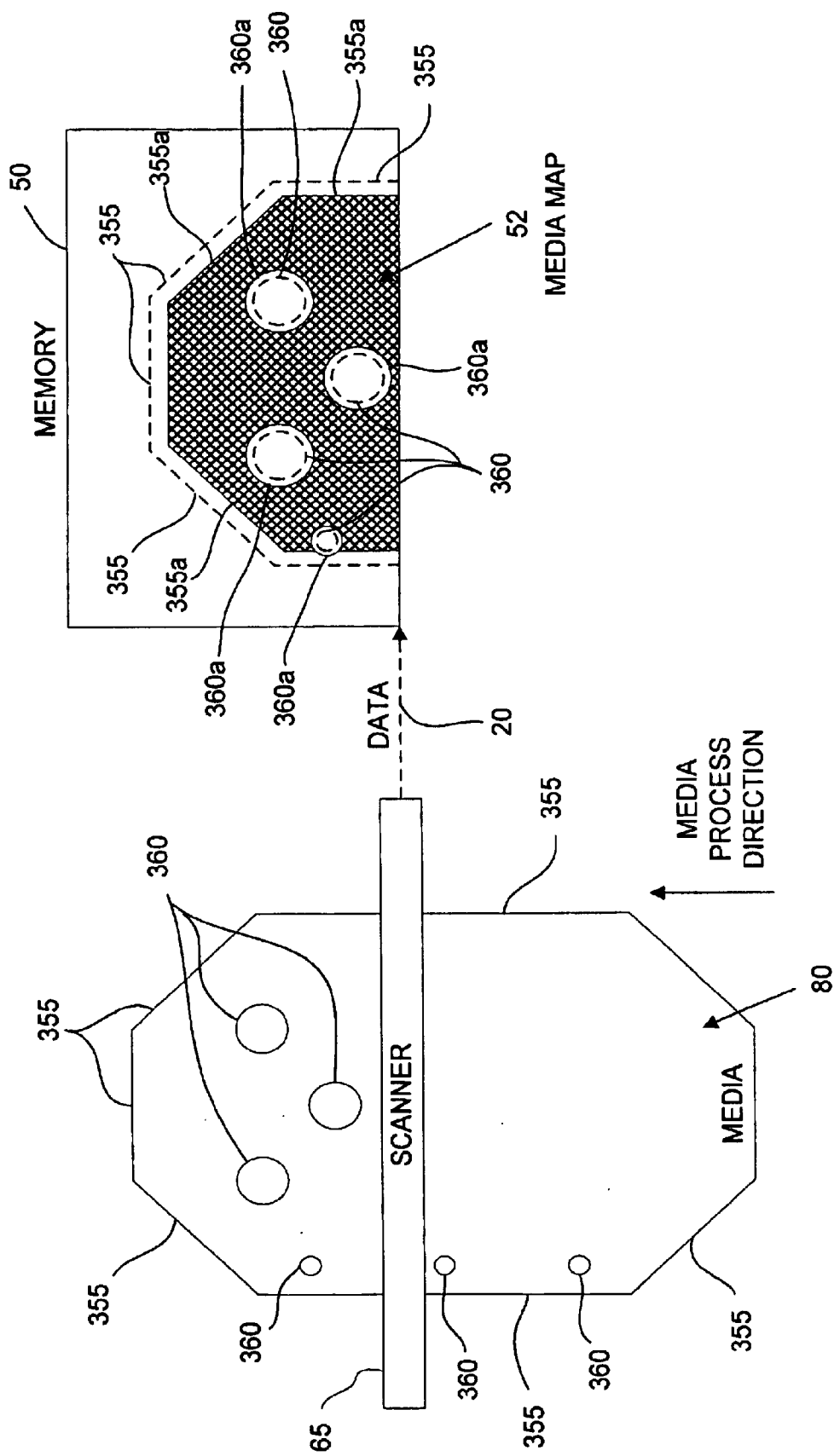
FIG. 6 is schematic block diagram of one embodiment of a media map generated from a scanned portion of a non-conventional media.

FIG. 6 depicts a schematic diagram of media 80 at a moment in time while it is being moved passed scanner device 65 to produce media map 52. Media 80 includes periphery edges 355 and voids 360. Media map 52 depicts how a surface area of media 80 is captured in memory 50, including identifying periphery edges 355 and voids 360. It should be noted that although map 52 is depicted as being stored in memory 50 in a positive format (i.e, a pixel is set "on" to reflect the existence of a surface area of media 80), it is understood that map 52 may also be stored in a negative format (i.e., each pixel is set "off" to reflect the existence of a surface area of media 80). In either case, corresponding control logic is modified accordingly as discussed with respect to FIG. 3, FIG. 4 and FIG. 7.

In a preferred embodiment, media map 52 is generated and stored in an adjusted manner such that it represents slightly less surface area than actually exists on media 80. Specifically, edges 355a of map 52 remain slightly within the actual edges 355 of media 80, and voids 360a of map 52 remain slightly around the actual voids 360 of media 80. In other words, if a representation of map 52 were overlaid onto the actual media 80, a "halo" effect would result from the edges 355 of media 80 actually extending slightly beyond the stored edges 355a, and from the voids 360 actually extending within the stored voids 360a. The amount of "halo" or shrinkage represented by media map 52 relative to actual media 80 is determined by design choice. For example, to retain a perception of "full bleed" printing, only a few or less pixels for each edge and void define the "halo". However, if "full bleed" is not desired, a larger number of pixels may similarly be defined to create a larger "halo" effect which results in a more visible gap or margin on the final imaged media. In any case, this "halo" variation in the map 52 relative to the actual media 80 defines a printable area within the actual edges and around any voids. Importantly, it accounts for inaccuracies in subsequent image generation onto media 80 in the event of unwanted movement or skew of the media in the path during scanning or imaging.

Alternatively, although not depicted in the Figure, media map 52 is stored to represent the surface area of media 80 precisely. Namely, edges 355 correlate exactly to edges 355a, and voids 360 correlate exactly to voids 360a. Subsequently, during image generation, detected edge (or near edge) pixels of map 52 are inverted such that the actual image generated occurs as if controlled by the mapped edges 355a shown in FIG. 6. Similarly, detected edge (or near edge) pixels about voids 360 are inverted such that the actual image generated occurs as if controlled by the mapped voids 360a shown in FIG. 6.

Obviously, if any kind of "halo" effect is desired, buffering of the scanned data or map data is required for subsequent processing by media mapping manger 60. For example, if an adjusted map is to be generated with the "halo" (i.e. in a reduced form relative to the actual surface area of the media), then after a scan line of data is detected by scanner 65, each pixel is evaluated and the desired number of respective pixels (defined by the "halo") are dropped off. Edge pixels, whether near the edge of the media or an edge of a void, are easily detected by monitoring transitions in pixel impingement values. Thus, a first buffer memory sufficiently large to hold the entire scan line is preferred to enable monitoring and acting upon detected transitions in the scan direction. Additionally, a second buffer also sufficiently large to hold the entire scan line is preferred to enable monitoring and acting upon detected transitions in the process direction.

Figure 7:
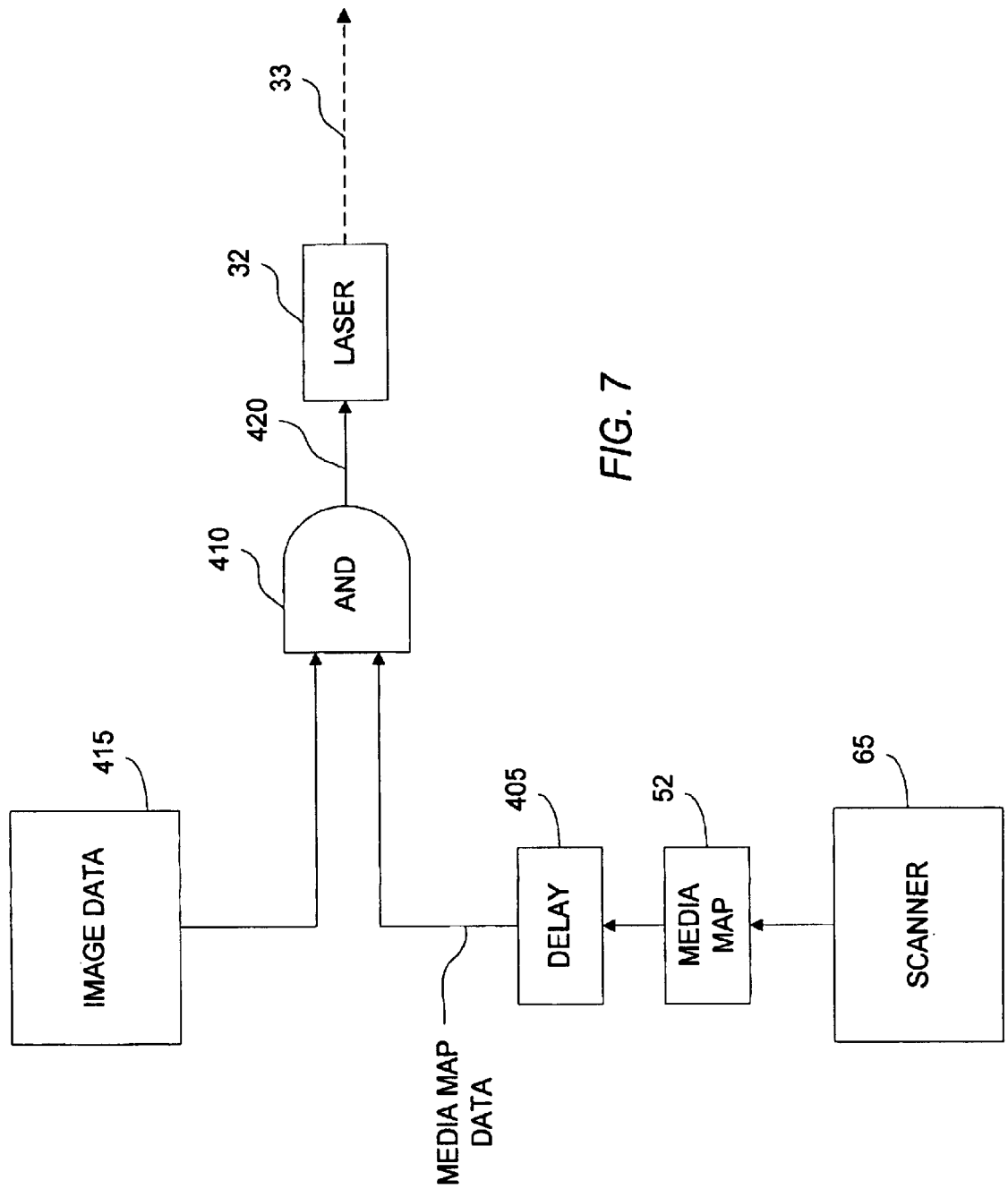
FIG. 7 is a schematic block diagram depicting one embodiment of cooperation of data between the media map and image data for the printer of FIG. 1.

FIG. 7 is a block diagram depicting the coordination of media map data and actual image data being processed by printer 10. As scanner device 65 generates media map 52, the map data is stored and, prior to coordinating with image data 415, is delayed 405 an amount of time equal to that associated with the "y" number of scan lines in FIG. 5. Subsequently, the media map data 52 is passed to AND control logic 410 for coordination with image data 415. Although AND control logic 410 is represented by a conventional digital AND gate, is it obvious that the AND gate is merely symbolic of the control that occurs under the present invention. For example, in a preferred embodiment, AND control logic 410 is implemented in firmware. However, hardwired AND gate circuitry in printer 10 is similarly feasible.

In any event, media map data 52 is sent to AND logic 410 in sync with image data 415. As such, if image data 415 falls within the periphery edges 355 of media 80, and outside of voids 360, then the AND logic 410 activates output signal 420 to enable laser 32 to pulse beam 33. Thus, an output image is generated only on OPC 34 that corresponds to the surface area of media 80 for subsequent development only on the surface area of media 80 and not beyond the peripheries 355 and not in the voids 360. Where the present invention is employed in an ink jet printer rather than a laser printer 10, output signal 420 enables the writing of the respective ink jet print head.

Figure 8:
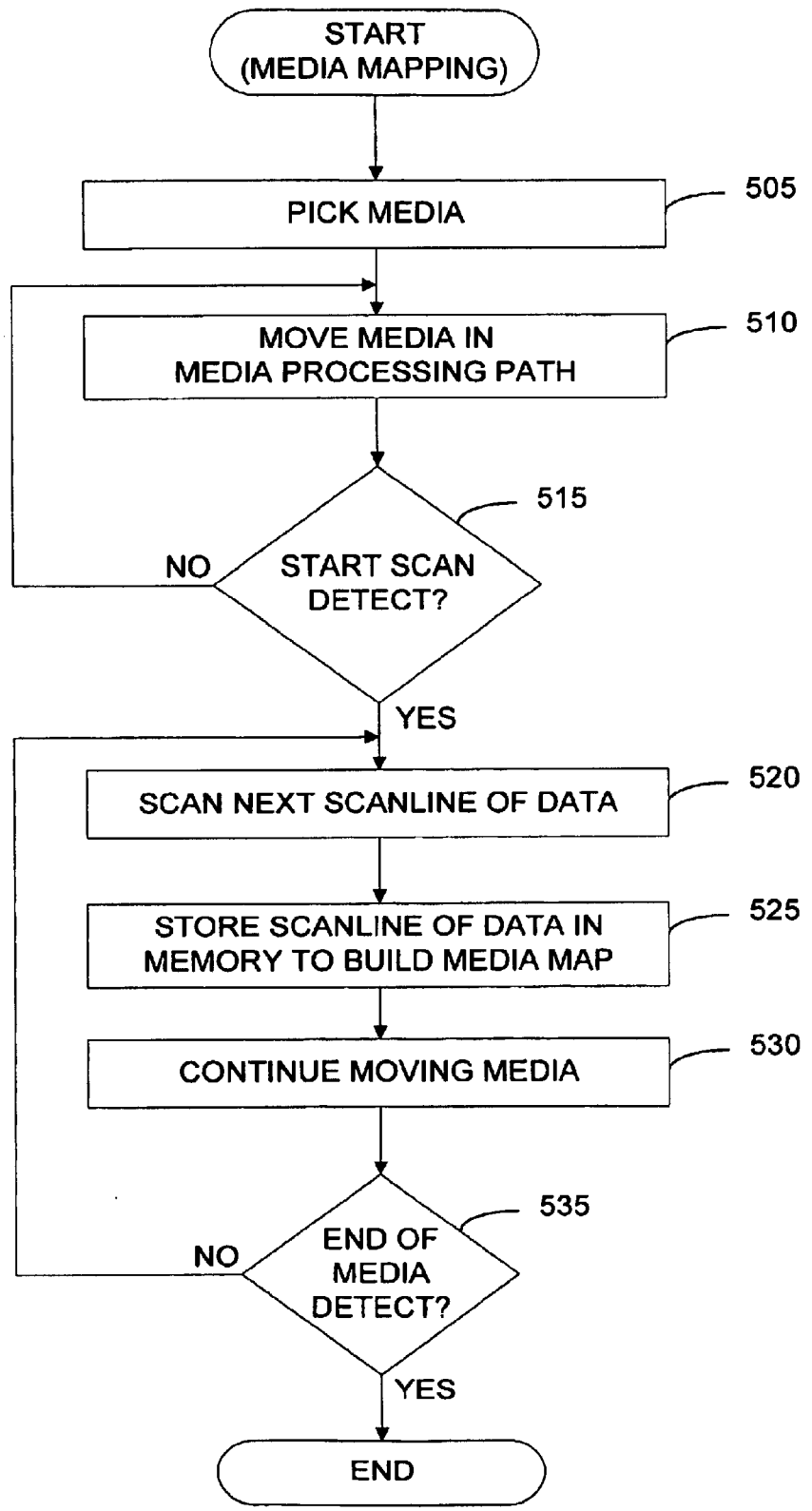
FIG. 8 is a flow diagram depicting one embodiment of a method of the present invention for media mapping.
Figure 9:
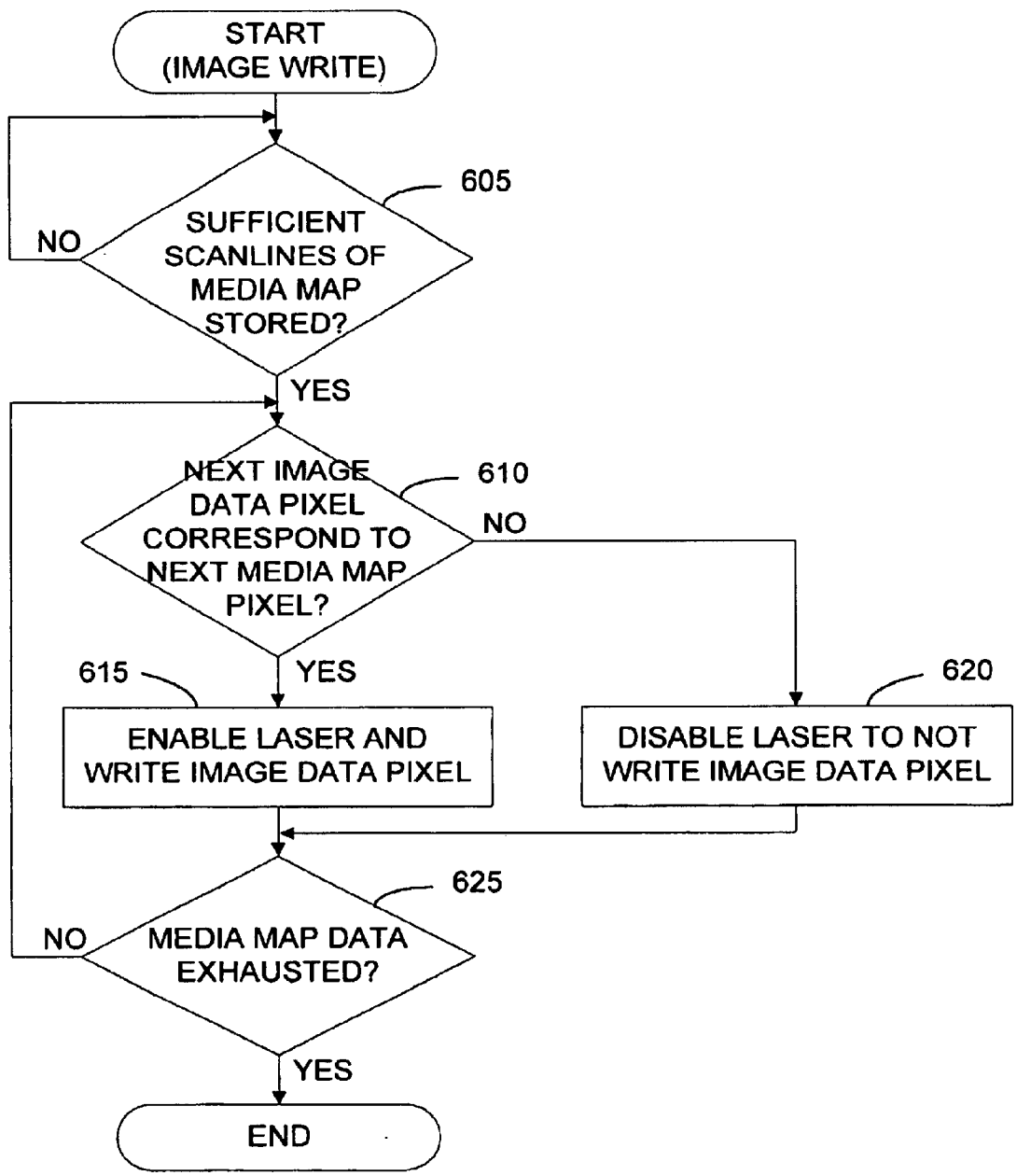
FIG. 9 is a flow diagram depicting one embodiment of a method of the present invention for controlling imaging based on a media map.

Referring now to FIG. 8 and FIG. 9, flow diagrams of a preferred method of the present invention are depicted. FIG. 8 describes a preferred media mapping process, and FIG. 9 describes a preferred imaging process based on the media map generated. These two processes execute independent of each other, albeit with the imaging process (FIG. 9) being initially dependent upon sufficient media map 62 having been generated by the media mapping process (FIG. 8).

Referring to FIG. 8 (along with FIGS. 1 & 2), upon initiation of a print job for printer 10, media 80 is picked 505 from input tray 12 and subsequently moved 510 into the media processing path of the printer. When the leading edge 82 of media 80 is detected 515 to be at scanner 65, then a scan line of data 520 is scanned by scanner 65. In a preferred embodiment, scanner 65 continuously scans once media 80 is initially picked by feed roller 75. When impingement is detected, which indicates media 80 has arrived at scanner 65, then only those impingement values and subsequent ones are stored in memory 50 to build media map 52. Alternatively, conventional media detect technology such as a mechanical or optical sensor/detector is utilized to detect the leading edge 82 arriving at scanner 65. In yet a further alternative embodiment, the leading edge is detected further upstream in the media path, such as closer to the feed roller 75, and then media travel time is monitored to initiate scanning at a point in time that coordinates with an expected arrival time of the leading edge to the scanner 65.

Once a scan line of pixel data is scanned 520 that is deemed to represent a portion of the media 80 (see discussion of FIGS. 3 & 4), then that data is stored 525 in memory 50 to build media map 52. Importantly, this scan line of data identifies substantially an entire surface area of media 80 for that scan line, including periphery edges and voids, if any, and the same is stored in media map 52. In a preferred embodiment, when the data is stored into the map it is slightly adjusted in a "halo" effect to account for media skew and movement during imaging (see the discussion referenced with FIG. 6).

Next, the media is moved 530 pursuant to the normal media movement process. Then, if no end-of-media is detected 535, the process is repeated and a next scan line of data is scanned 520 and stored 525 to continue building media map 52. This process of scanning 520, storing 525 and moving the media 530 continues until the trailing edge of media 80 is detected 535. The trailing edge is indicative of the entire media 80 having moved passed scanner 65 and, consequently, the entire surface area of media 80 having been scanned and stored to build media map 52. Preferably, the trailing edge is detected by scanner 65, i.e., an entire scan line of non-impingement values is detected. Alternatively, image data 415 is monitored and, corresponding to when it is detected that the image data is exhausted for the current page, the scanning likewise is terminated. In yet further alternate embodiments, the trailing edge is detected either by mechanical or optical sensor, or by time monitoring relative to some earlier trailing edge detect in the media path.

Referring now to FIG. 9, if sufficient scan lines of media map 52 have been generated 605 (see FIG. 8), then imaging will occur. "Sufficient" scan lines is set by design criteria of printer 10 and especially as it relates to the relative positions between scanner 65 and OPC 34 as discussed in reference to FIG. 5. Thus, depending upon component positioning and other relevant design criteria, anywhere from one (if y=0) or more (if y>0) scan lines forming media map 52 may be sufficient to initiate imaging control per the remaining steps in FIG. 9.

Once media map 52 exists 605, then a next pixel (or signal) from the map 52 is coordinated 610 with a next pixel (or signal) from the image data 415 being processed by printer 10. If the image data pixel corresponds 610 to a media map pixel, (i.e., if the image data pixel is defined to be disposed at a location that corresponds to a surface area location of the media 80 as defined by the map 52), then laser 32 is enabled to write the image data pixel 615. On the other hand, if the image data pixel does not correspond 610 to a media map pixel, then laser 32 is disabled to not write the image data pixel 620. For a preferred embodiment of enabling or disabling laser 32, see FIG. 7. Subsequently, 625, if there are more pixels to process in the media map 52 (i.e., the data is not exhausted), then the steps are repeated 610, 615 or 610, 620. Finally, when the media map data is exhausted 625, imaging is complete.

Advantageously, the present invention enables "full bleed" (edge-to-edge) imaging without concern for improper image development beyond the media edges. This is particularly beneficial for custom shaped or sized media. Additionally, voids are detected, including cutouts, holes, and pre-punched media, and imaging is prevented in such voids.

Finally, what has been described above are the preferred embodiments of a system and method for mapping media to ensure image writing only on the media, even in the event of custom shaped or sized media, or voids in the media. It will be obvious to one of ordinary skill in the art that the present invention is easily implemented utilizing any of a variety of hardware components and software tools existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of imaging in an imaging device, comprising:
   (a) mapping a surface area of a media to be imaged by the imaging device, the surface area including substantially an entire area of the media associated with at least one given scan line of the imaging device; and,
   (b) controlling the imaging device based on the mapped surface area such that imaging does not occur at a void in the media.

2. The method of claim 1 wherein mapping the surface area includes identifying peripheral bounds of the media.

3. The method of claim 1 wherein mapping the surface area includes identifying at least one void in the media.

4. The method of claim 1 wherein mapping includes scanning the media for identifying the surface area.

5. The method of claim 1 further including mapping the surface area to an adjusted surface area and controlling the imaging device based on the adjusted surface area.

6. The method of claim 1 wherein controlling the imaging device includes controlling a write signal of the imaging device.

7. The method of claim 1 wherein the imaging device includes an electrophotographic imaging device having a laser beam for developing an image, and wherein controlling the imaging device includes controlling by enabling and disabling the laser beam.

8. The method of claim 1 wherein the imaging device includes an ink jet device having an ink print head for inking an image, and wherein controlling the imaging device includes controlling by enabling and disabling a firing of the ink print head.

9. The method of claim 1 wherein controlling the imaging device occurs such that physical image development on the media occurs relative to the map regardless of any original electronic image to be generated.

10. A method of imaging in an imaging device, comprising:
   (a) scanning at least a portion of a media to be imaged by the imaging device, the portion including substantially an entire area of the media associated with at least one given scan line of the imaging device;
   (b) generating a map of the at least a portion of the media based on the scanning; and,
   (c) controlling the imaging device such that image development occurs only at physical locations on the media identified by the map and image development does not occur at a void in the media.

11. The method of claim 10 wherein the map identifies an edge of the media.

12. The method of claim 10 wherein the map identifies a void in the media.

13. The method of claim 10 wherein the map includes an adjusted representation of substantially an entire area of the media associated with at least one given scan line of the imaging device.

14. An imaging device, comprising:
(a) a print engine;
(b) means for generating a map of a surface area of a media to be imaged by the print engine, the surface area including substantially an entire area of the media associated with at least one given scan line of the imaging device; and,
(c) means for controlling the print engine based on the map such that imaging does not occur at a void in the media.

15. The imaging device of claim 14 wherein the means for generating a map includes a scanning device.

16. The imaging device of claim 15 wherein the means for generating a map further includes hardware, software or firmware configured to store signals from the scanning device, the signals being indicative of the surface area of the media to be imaged.

17. The imaging device of claim 14 wherein the means for controlling the print engine includes hardware, software or firmware configured to coordinate data from the map with image data associated with the print engine.

18. The imaging device of claim 14 wherein the imaging device includes electrophotographic components and a laser beam for developing an image, and wherein the means for controlling the print engine includes controlling enabling and disabling the laser beam.

19. The imaging device of claim 14 wherein the imaging device includes ink jet components and an ink print head for inking an image, and wherein the means for controlling the print engine includes controlling by enabling and disabling a firing of the ink print head.

20. The imaging device of claim 14 wherein the map includes an adjusted representation of the surface area.

21. The imaging device of claim 14 wherein the map includes peripheral bounds of the media.

22. The imaging device of claim 14 wherein the map includes at least one void in the media.

23. A computer-readable medium having computer-executable instructions for enabling the following:
(a) determining surface area features of a recording media, including periphery boundaries and voids, if any, the surface area features defined with respect to at least one given scan line of an imaging device; and,
(b) managing the imaging device based on the surface area features such that imaging occurs neither beyond a periphery nor in a void in the media.

24. A printing device, comprising:
(a) a scanning device configured to determine surface area features of a recording media, including periphery boundaries and voids, if any, the surface area features defined with respect to at least one given scan line of the printing device; and,
(b) a controller configured to manage printing with the printing device based on the surface area features such that printing of an image occurs neither external to an edge nor in a void in the media.

25. The printing device of claim 24 wherein the controller is configured to manage printing of the recording media based on an adjusted description of the surface area features.

* * * * *